(12) United States Patent  
Chang et al.

(10) Patent No.: US 8,102,372 B2
(45) Date of Patent: Jan. 24, 2012

(54) OPTICAL MOUSE TESTING DEVICE

(75) Inventors: Pei-Ming Chang, Taipei (TW);
Chien-Ming Su, Taipei (TW)

(73) Assignee: Primax Electronics Ltd., Taipei (TW)

( * ) Notice: Subject to any disclaimer, the term of this patent is extended or adjusted under 35 U.S.C. 154(b) by 292 days.

(21) Appl. No.: 12/634,902

(22) Filed: Dec. 10, 2009

(65) Prior Publication Data

US 2011/0032539 A1 Feb. 10, 2011

(30) Foreign Application Priority Data

Aug. 10, 2009 (TW) .............................. 98126690 A

(51) Int. Cl.
*G09G 5/08* (2006.01)
(52) U.S. Cl. ........ 345/166; 345/156; 345/157; 345/163; 356/614
(58) Field of Classification Search ................... 345/166, 345/156, 157, 163; 356/614–623; 438/128
See application file for complete search history.

(56) References Cited

U.S. PATENT DOCUMENTS

| 7,444,005 B2* | 10/2008 | Bachur et al. ................. 382/107 |
| 7,715,016 B2* | 5/2010 | Hwang et al. ................. 356/498 |
| 2005/0225536 A1* | 10/2005 | Hsieh et al. ................... 345/166 |
| 2005/0289251 A1* | 12/2005 | Lee et al. ........................ 710/14 |
| 2007/0059867 A1* | 3/2007 | Kuo et al. ..................... 438/128 |
| 2008/0238876 A1* | 10/2008 | Moyer et al. ................. 345/166 |

* cited by examiner

*Primary Examiner* — Hoa Pham
(74) *Attorney, Agent, or Firm* — Kirton & McConkie; Evan R. Witt

(57) ABSTRACT

An optical mouse testing device includes a testing frame, a control unit, a transmission unit, a rolling unit and an indicating unit. An optical mouse to be tested is placed on an upper surface of the testing frame. The control unit is used for driving the transmission unit according to the route coordinate data. The transmission unit is used for rendering a rolling motion of a ball of the rolling unit. The optical mouse senses the rolling motion of the ball, thereby providing a route coordinate data to the control unit. The control unit compares the route control signal with the route coordinate data, thereby generating an indicating signal to indicate a testing result.

10 Claims, 6 Drawing Sheets

OPTICAL MOUSE TESTING DEVICE

FIELD OF THE INVENTION

The present invention relates to an optical mouse testing device and an optical mouse testing method, and more particularly to an optical mouse testing device and an optical mouse testing method for testing an optical mouse without the need of moving the optical mouse.

BACKGROUND OF THE INVENTION

Due to the amazing power of computers, computers become essential data processing apparatuses in our daily lives. For example, the users could acquire important information (e.g. meteorological information, traffic information, news or uniform invoice number) via the computers. In addition, the users could communicate with their friends through instant messaging software, e-mails or video transmission by using the computers. As known, a human-machine interface input device is an essential component of the computer for communicating the user and the computer. In particular, a mouse is a widely-used human-machine interface input device.

For assuring the customers of the reliability of the mice, all of the mice should be subject to a testing process before they are introduced into the market. Generally, most of mice are tested by a testing machine in the practical producing process. FIG. 1 is a schematic functional block diagram illustrating a mouse detecting machine disclosed in Taiwanese Patent Publication No. M284881. As shown in FIG. 1, the mouse detecting machine 10 comprises a mouse supporting mechanism 101, a route travelling mechanism 103 and a data processing unit 105. The mouse supporting mechanism 101 is connected with and fixed on the route travelling mechanism 103. The mouse 20 to be tested is supported and fixed on the mouse supporting mechanism 101. According to at least one testing conditions, the route travelling mechanism 103 will provide corresponding testing conditions and a testing route to the mouse supporting mechanism 101, thereby driving the mouse 20 to move along the route. The data processing unit 105 is also connected with the route travelling mechanism 103 for issuing the instruction associated with the testing conditions. During the process of moving the mouse 20, an XY-trajectory signal is issued from the mouse 20 to the data processing unit 105. The XY-trajectory signal is processed by the data processing unit 105, and thus a corresponding testing result is outputted from the data processing unit 105.

The conventional mouse detecting machine 10, however, still has some drawbacks. For enhancing the testing reliability of the mouse 20, the mouse 20 needs to generate sufficient amount of XY-trajectory signals. In order to generate sufficient amount of XY-trajectory signals, the mouse supporting mechanism 101 should have a large area to provide a sufficient moving zone for the mouse 20. Generally, in the mouse testing process, the mouse 20 needs to generate a 100 cm-long X-trajectory signal, a 100 cm-long Y-trajectory signal or a 100 cm-diameter trajectory signal. That is, the volume of the mouse detecting machine 10 is very bulky. Especially in the factory for mass-producing mice, a lot of detecting machines 10 are necessary to efficiently test the mice. As known, too many mouse detecting machines 10 occupy much space of the factory. In order to increase the space utilization, the volume of each mouse detecting machine should be largely reduced while maintaining the function of testing the optical mouse with the same testable items.

SUMMARY OF THE INVENTION

An object of the present invention provides an optical mouse testing device and an optical mouse testing method, in which the trajectory testing operation is performed without the need of moving the optical mouse.

Another object of the present invention provides an optical mouse testing device having reduced volume and enhanced space utilization, when compared with the conventional mouse testing machine.

In accordance with an aspect of the present invention, there is provided an optical mouse testing device. The optical mouse testing device includes a testing frame, a control unit, a transmission unit, a rolling unit and an indicating unit. The testing frame includes a testing hole, an upper surface and a lower surface. An optical mouse to be tested is supported on the upper surface. The testing hole is arranged in a center of the testing frame. The lower surface is parallel with the upper surface. A sensor of the optical mouse is disposed over the testing hole for providing a route coordinate data. The control unit is disposed on the testing frame for receiving the route coordinate data and providing a route control signal and an indicating signal. The transmission unit is disposed on the lower surface of the testing frame and electrically connected with the control unit. The transmission unit includes two rolling shafts. The two rolling shafts are rotated according to the route control signal. The rolling unit is disposed on the lower surface of the testing frame, and includes a ball seat and a ball. The ball seat is disposed under the testing hole for supporting the ball. The ball is contacted with the two rolling shafts. The indicating unit is disposed on the testing frame and electrically connected with the control unit. When receiving the indicating signal, the indicating unit generates a corresponding testing light prompt. The two rolling shafts are rolled to render a rolling motion of the ball. The sensor of the optical mouse senses the rolling motion of the ball to generate the route coordinate data, and the control unit compares the route control signal with the route coordinate data, thereby generating the indicating signal to indicate a testing result.

In an embodiment, the rolling directions of the rolling shafts are substantially perpendicular to each other, thereby rendering a vertical rolling motion and a horizontal rolling motion of the ball.

In an embodiment, the transmission unit further includes two stepper motors, which are respectively connected with the two rolling shafts and operated according to the route control signal.

In an embodiment, the optical mouse testing device is connected with a computer system. The computer system includes a host, an input unit and a monitor. The host is used for providing the route control signal, the indicating signal and a testing data, and receiving the route coordinate data. The host compares the route coordinate data with the route control signal, thereby generating the indicating signal and testing data. The input unit is electrically connected to the host for allowing a user to adjust the route control signal. The monitor is electrically connected to the host for indicating the testing data.

In an embodiment, the transmission unit further includes a fulcrum shaft in contact with the ball. The ball is fixed between the two rolling shafts and the fulcrum shaft. The fulcrum shaft is arranged at an internal angle bisector of an angle between the two rolling shafts.

In an embodiment, the ball seat includes three notches, which are disposed under the lower surface of the testing frame for accommodating and positioning the two rolling shafts and the fulcrum shaft, respectively.

In an embodiment, the optical mouse testing device further includes a retaining wall disposed on the upper surface of the testing frame and surrounding the testing hole. A shape of the retaining wall is fitted to a shape of the optical mouse, so that the optical mouse is confined within a receptacle defined by the retaining wall.

In accordance with another aspect of the present invention, there is provided an optical mouse testing method. The optical mouse testing method includes the steps of: (1) placing a sensor of an optical mouse to be tested over a testing hole of a testing frame, (2) driving a transmission unit according to a route control signal, thereby rolling two rolling shafts of the transmission unit, (3) rendering a rolling motion of a ball of a rolling unit by rolling the two rolling shafts, (4) allowing the sensor of the optical mouse to sense the rolling motion of the ball, thereby providing a route coordinate data, (5) comparing the route coordinate data with the route control signal, thereby generating an indicating signal, and (6) generating a testing light prompt according to the indicating signal.

In an embodiment, the step (2) further includes a sub-step of adjusting the route control signal by an input unit.

In an embodiment, the step (5) further includes a sub-step of comparing the route coordinate data with the route control signal, thereby generating a testing data.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides an optical mouse testing device and an optical mouse testing method, in which the trajectory testing operation is performed without the need of moving the optical mouse. In addition, the optical mouse testing device of the present invention has reduced volume and enhanced space utilization, when compared with the conventional mouse testing machine.

Figure 1:
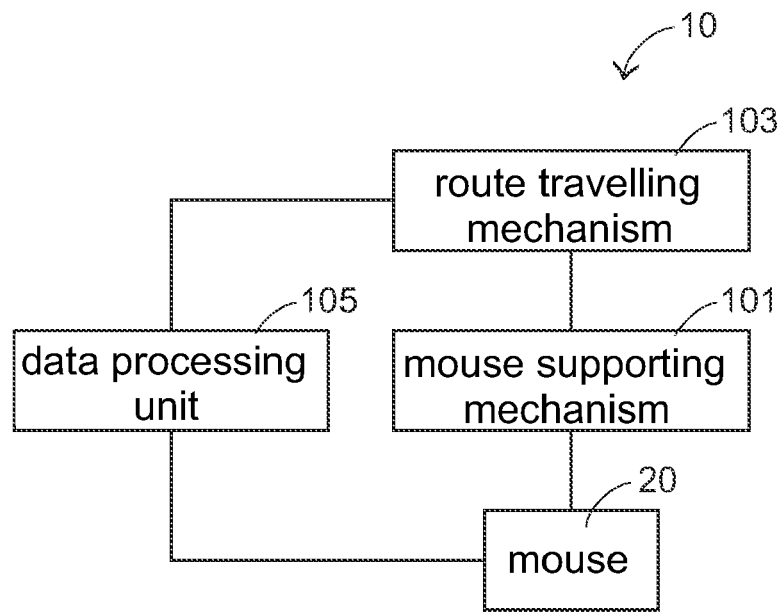
FIG. 1 is a schematic functional block diagram illustrating a mouse detecting machine disclosed in Taiwanese Patent Publication No. M284881.
Figure 2:
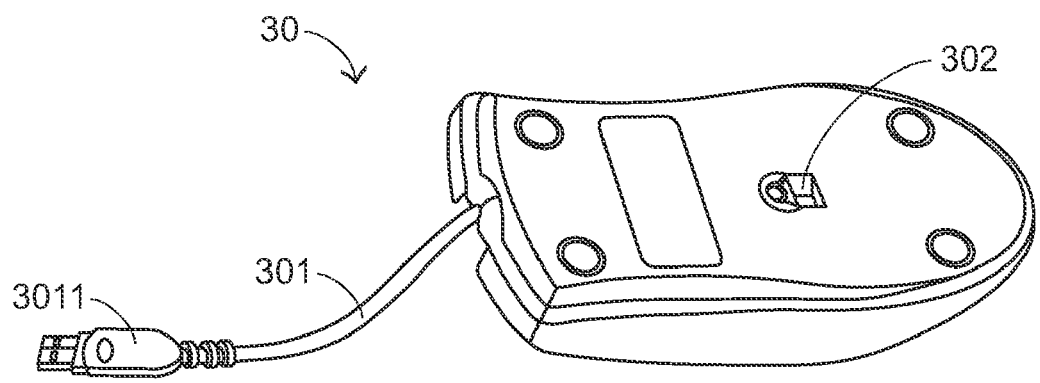
FIG. 2 is a schematic perspective view illustrating the outward appearance of an optical mouse to be tested by the optical mouse testing device of the present invention.

FIG. 2 is a schematic perspective view illustrating the outward appearance of an optical mouse to be tested by the optical mouse testing device of the present invention. As shown in FIG. 2, the optical mouse 30 comprises a transmission line 301 and a sensor 302. The transmission line 301 is used for transmitting a route coordinate data. In addition, an end of the transmission line 301 has a connector 3011 to be connected with a data receiving terminal of the optical mouse testing device. The sensor 302 is disposed at the bottom of the optical mouse 30 for sensing a displacement of the optical mouse 30 relative to a desk plane (not shown), thereby providing the route coordinate data.

Figure 3:
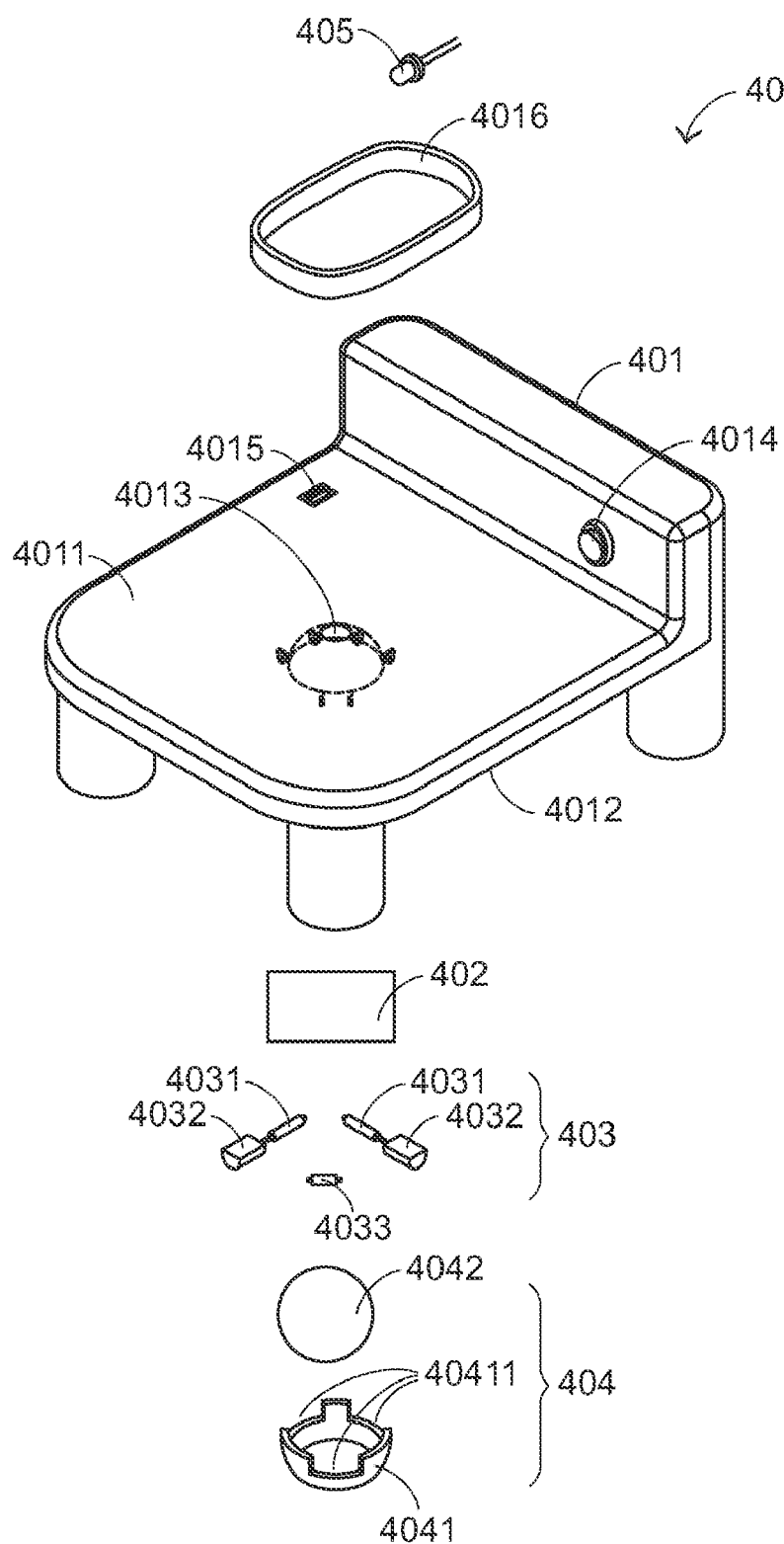
FIG. 3 is a schematic exploded view illustrating an optical mouse testing device according to an embodiment of the present invention.
Figure 4:
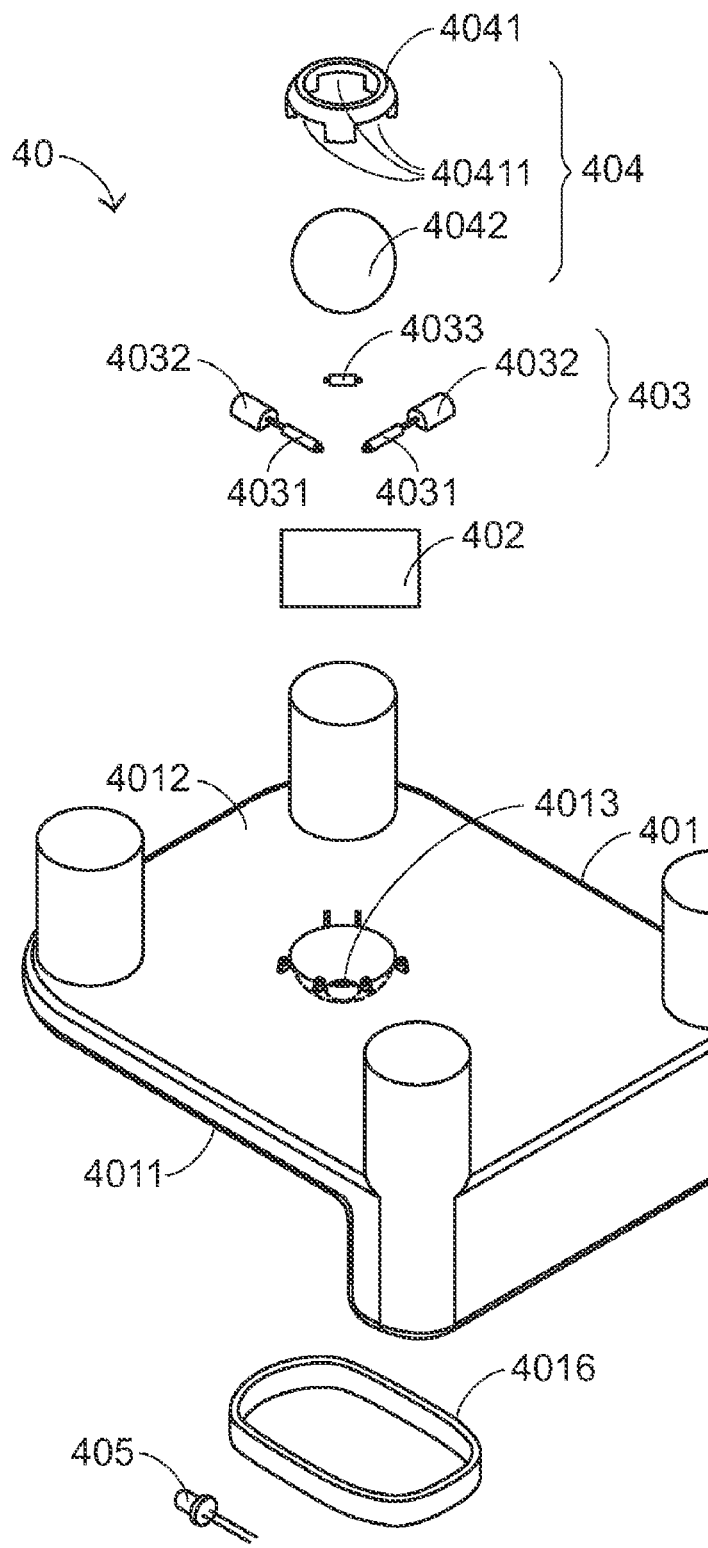
FIG. 4 is a schematic exploded view illustrating the optical mouse testing device of FIG. 2 that is taken in another viewpoint.

FIG. 3 is a schematic exploded view illustrating an optical mouse testing device according to an embodiment of the present invention. FIG. 4 is a schematic exploded view illustrating the optical mouse testing device of FIG. 2 that is taken in another viewpoint. Please refer to FIGS. 3 and 4. The optical mouse testing device 40 is used for testing the optical mouse 30 as shown in FIG. 2. The optical mouse testing device 40 comprises a testing frame 401, a control unit 402, a transmission unit 403, a rolling unit 404 and an indicating unit 405.

The testing frame 401 comprises an upper surface 4011, a lower surface 4012, a testing hole 4013, a button 4014, a connecting port 4015 and a retaining wall 4016. The optical mouse 30 to be tested is supported on the upper surface 4011. The testing hole 4013 is arranged in the center of the testing frame 401. Through the testing hole 4013, the sensor 302 of the optical mouse 30 could sense the motion of the rolling unit 404, which is disposed under the testing hole 4013. In addition, a hemi-spherical recess structure is formed under the testing hole 4013 for accommodating a ball 4042 of the rolling unit 404. Both of the button 4014 and the connecting port 4015 are connected with the control unit 402. When the button 4014 is depressed, the optical mouse testing device 40 is triggered to perform a mouse testing process. The connecting port 4015 is connected with the connector 3011 of the optical mouse 30 for receiving the route coordinate data from the optical mouse 30. The retaining wall 4016 is disposed on the upper surface 4011 of the testing frame 401 and surrounds the testing hole 4013. Furthermore, the shape of the retaining wall 4016 is fitted to the shape of the optical mouse 30, so that the optical mouse 30 is confined within a receptacle defined by said retaining wall 4016.

The control unit 402 is disposed on the testing frame 401 for providing a predetermined route control signal to drive the transmission unit 403. In addition, the control unit 402 also receives the route coordinate data and then compares the route coordinate data with the route control signal. According to a difference between the route coordinate data and the route control signal, the control unit 402 generates a corresponding indicating signal to the indicating unit 405.

The transmission unit 403 is disposed on the lower surface 4012 of the testing frame 401 and electrically connected with the control unit 402. The transmission unit 403 comprises two rolling shafts 4031 and two stepper motors 4032. These two stepper motors 4032 are connected with the two rolling shafts 4031, respectively. According to the route control signal, the two stepper motors 4032 are activated to roll the rolling shafts 4031, thereby rendering the rolling motion of the rolling unit 404. In this embodiment, the rolling directions of these rolling shafts 4031 are substantially perpendicular to each other, so that a vertical rolling motion and a horizontal rolling motion of a component of the rolling unit 404 are possible. Moreover, for smoothly rotating the component of the rolling unit 404, the transmission unit 403 further comprises a fulcrum shaft 4033. The component of the rolling unit 404 is fixed between the rolling shafts 4031 and the fulcrum shaft 4033. In addition, the fulcrum shaft 4033 is arranged at the internal angle bisector of the angle between the two rolling shafts 4031.

The rolling unit 404 is disposed on the lower surface 4012 of the testing frame 401. The rolling unit 404 comprises a ball seat 4041 and a ball 4042. The ball seat 4041 is disposed under the testing hole 4013 for supporting the ball 4042. The ball 4042 is accommodated within the ball seat 4041 and contacted with the rolling shafts 4031 and the fulcrum shaft 4033. By rotating the two rolling shafts 4031 to render a rolling motion of the ball 4042, the sensor 302 of the optical mouse 30 senses the motion of the ball 4042, thereby generating a route coordinate data to the control unit 402. Moreover, the ball seat 4041 has three notches 40411. The three notches 40411 are disposed under the lower surface 4012 of the testing frame 401 for accommodating and positioning the two rolling shafts 4031 and the fulcrum shaft 4033, respectively. As a consequence, the two rolling shafts 4031 and the fulcrum shaft 4033 of the transmission unit 403 could be effectively contacted with the ball 4042 so as to render a rolling motion of the ball 4042.

As previously described, after the route coordinate data is received by the control unit 402, the control unit 402 will compare the route coordinate data with the route control signal. According to a difference between the route coordinate data and the route control signal, the control unit 402 generates a corresponding indicating signal to the indicating unit 405. The indicating unit 405 is disposed on the testing frame 401 and electrically connected with the control unit 402. When receiving the indicating signal, the indicating unit 405 displays a corresponding testing light prompt to indicate the testing result. In an embodiment, the indicating unit 405 is a LED lamp for emitting a red testing light prompt or a green testing light prompt to indicate a failed testing result or a successful testing result, respectively, in order to notify the user of the testing result. Moreover, the indicating unit 405 includes a monitor for showing more detailed testing data. For example, after the control unit 402 compares the route coordinate data and the route control signal, respective differential ratio between the route coordinate data and the route control signal when the rolling trajectory is a vertical line trajectory, a horizontal line trajectory, an oblique line trajectory, a circular trajectory, a triangular trajectory or a square trajectory will be shown on the indicating unit 405. Alternatively, other testing data could be shown on the indicating unit 405.

Figure 5:
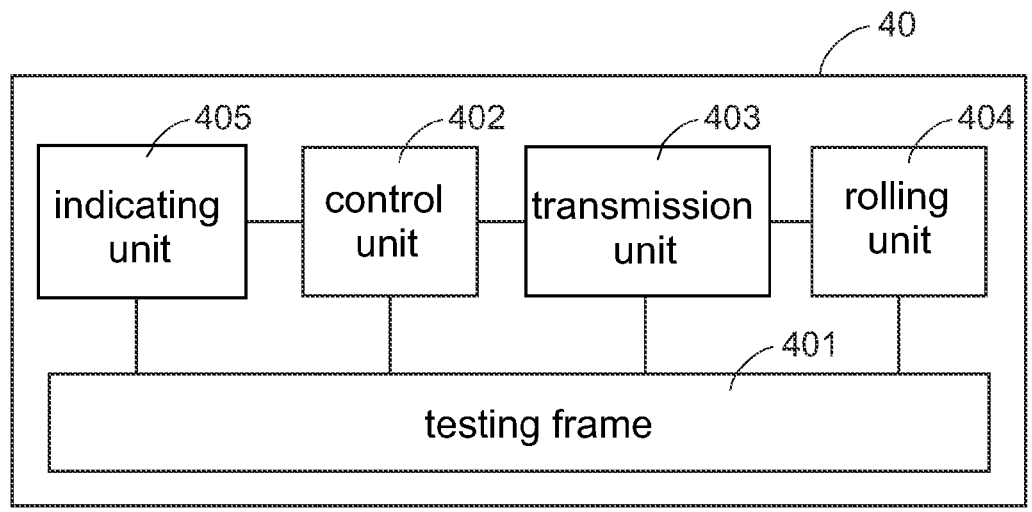
FIG. 5 is a schematic functional block diagram illustrating an optical mouse testing device according to an embodiment of the present invention.

FIG. 5 is a schematic functional block diagram illustrating an optical mouse testing device according to an embodiment of the present invention. As shown in FIG. 5, the optical mouse testing device 40 comprises a testing frame 401, a control unit 402, a transmission unit 403, a rolling unit 404 and an indicating unit 405. The control unit 402, the transmission unit 403, the rolling unit 404 and the indicating unit 405 are all disposed on the testing frame 401. The control unit 402 is electrically connected with the transmission unit 403 and the indicating unit 405. The transmission unit 403 is also connected with the rolling unit 404. The control unit 402 provides a predetermined route control signal to drive the transmission unit 403, so that the transmission unit 403 renders a rolling motion of a component of the rolling unit 404. Moreover, the optical mouse 30 to be tested (see FIG. 3) is placed on the testing frame 401 and electrically connected with the control unit 402. Once the optical mouse 30 senses the rolling motion of the rolling unit 404, the optical mouse 30 generates a route coordinate data to the control unit 402. After receiving the route coordinate data, the control unit 402 compares the route coordinate data with the route control signal. According to a difference between the route coordinate data and the route control signal, the control unit 402 generates a corresponding indicating signal to the indicating unit 405. When receiving the indicating signal, the indicating unit 405 displays a corresponding testing light prompt to indicate the testing result.

Figure 6:
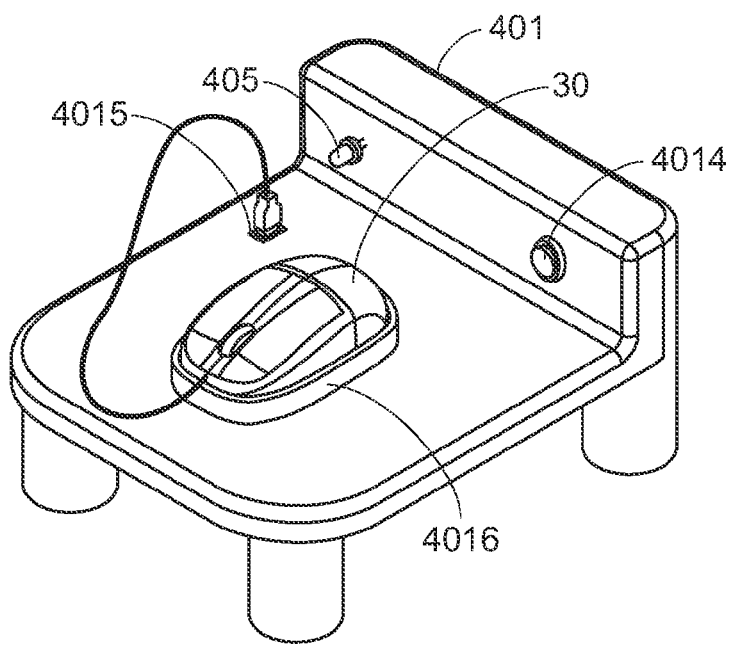
FIG. 6 is a schematic perspective view illustrating an optical mouse being tested by the optical mouse testing device of the present invention.

FIG. 6 is a schematic perspective view illustrating an optical mouse being tested by the optical mouse testing device of the present invention. The optical mouse 30 to be tested (see FIG. 3) is placed within the receptacle defined by the retaining wall 4016 of the testing frame 401. The optical mouse 30 is electrically connected with the control unit 402 through the connecting port 4015 (see FIG. 3). As such, the sensor 302 (see FIG. 2) of the optical mouse 30 is disposed over the testing hole 4013 (see FIG. 3) for sensing the motion of the rolling unit 404. When the button 4014 is depressed to enable the optical mouse testing device 40, the control unit 402 provides a predetermined route control signal to drive the transmission unit 403. At the same time, the two stepper motors 4032 of the transmission unit 403 (see FIG. 3) will roll the two rolling shafts 4031 (see FIG. 3), thereby rendering a specified rolling motion of the ball 4042 of the rolling unit 404. According to the rolling motion of the ball 4042 of the rolling unit 404, the sensor 302 of the optical mouse 30 provides a route coordinate data to the control unit 402. After receiving the route coordinate data, the control unit 402 compares the route coordinate data with the route control signal. According to a difference between the route coordinate data and the route control signal, the control unit 402 generates a corresponding indicating signal to the indicating unit 405. When receiving the indicating signal, the indicating unit 405 displays a corresponding testing light prompt to indicate the testing result.

Figure 7:
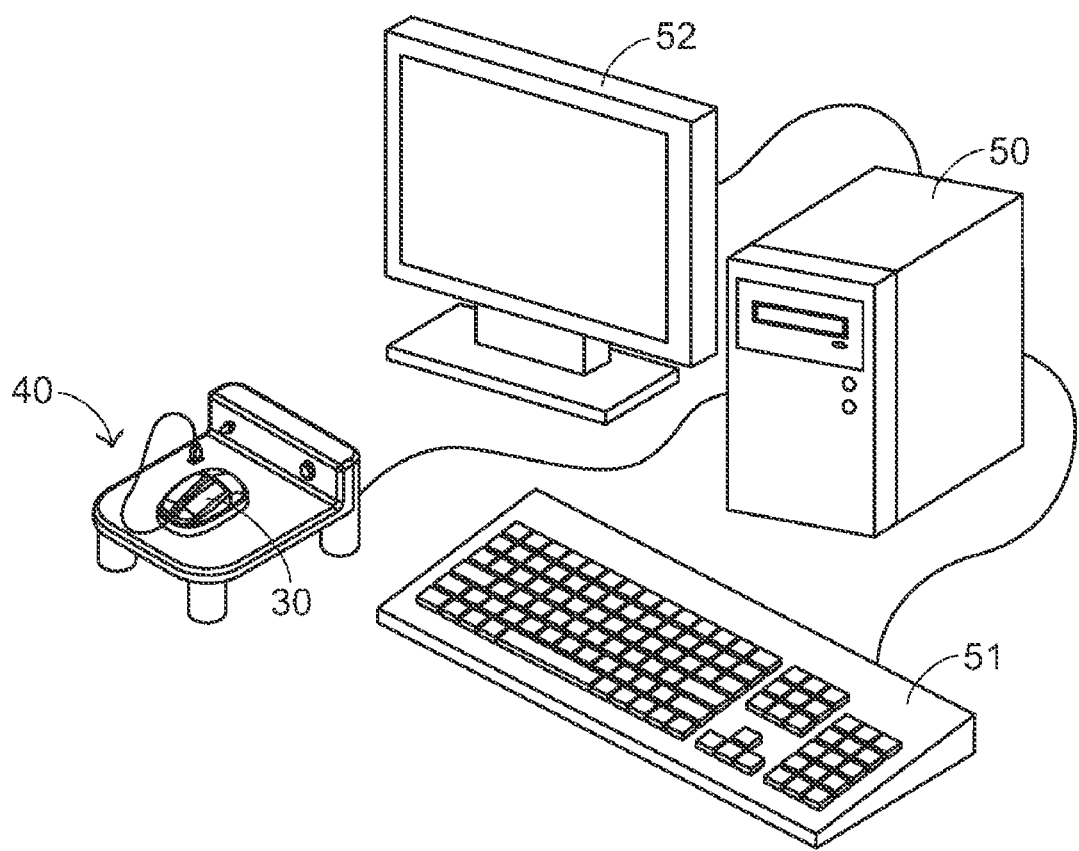
FIG. 7 is a schematic view illustrating the connection between the optical mouse testing device of the present invention and a computer system.

FIG. 7 is a schematic view illustrating the connection between the optical mouse testing device of the present invention and a computer system. As shown in FIG. 7, the optical mouse testing device 40 is electrically connected with a computer system. The computer system comprises a host 50, an input unit 51 and a monitor 52. The input unit 51 is electrically connected with the host 50. According to the type of the optical mouse to be tested or a testing criterion, the user could input an instruction to the host 50 through the input unit 51, thereby adjusting the route control signal. For example, according to different route control signals, the transmission unit 403 of the optical mouse testing device 40 will render different rolling motions of the ball 4042 of the rolling unit 404 (see FIG. 3), thereby resulting in different rolling trajectories. The rolling trajectories include for example a vertical line trajectory, a horizontal line trajectory, an oblique line trajectory, a circular trajectory, a triangular trajectory or a square trajectory. Due to different rolling trajectories, the sensor 302 of the optical mouse 30 (see FIG. 30) generates corresponding route coordinate data when sensing the rolling motions of the ball 4042. The route coordinate data is transmitted to the host 50. The host 50 is electrically connected with the optical mouse testing device 40 for providing a route control signal, an indicating signal and a testing data, and receiving the route coordinate data from the optical mouse 30. After the route coordinate data is received by the host 50, the host 50 will compare the route coordinate data with the route control signal and provide more detailed testing data. The testing data includes respective differential ratio between the route coordinate data and the route control signal when the rolling trajectory is a vertical line trajectory, a horizontal line trajectory, an oblique line trajectory, a circular trajectory, a triangular trajectory or a square trajectory. Alternatively, the testing data includes respective differential ratio between the route coordinate data and the route control signal at different rolling speeds. The monitor 52 is connected with the host 50 for displaying the testing data. Moreover, the trajectories of the route control signal and the route coordinate data could be simultaneously shown on the monitor 52. As such, the user could realize the possible testing problem by observing the difference between these two trajectories.

Figure 8:
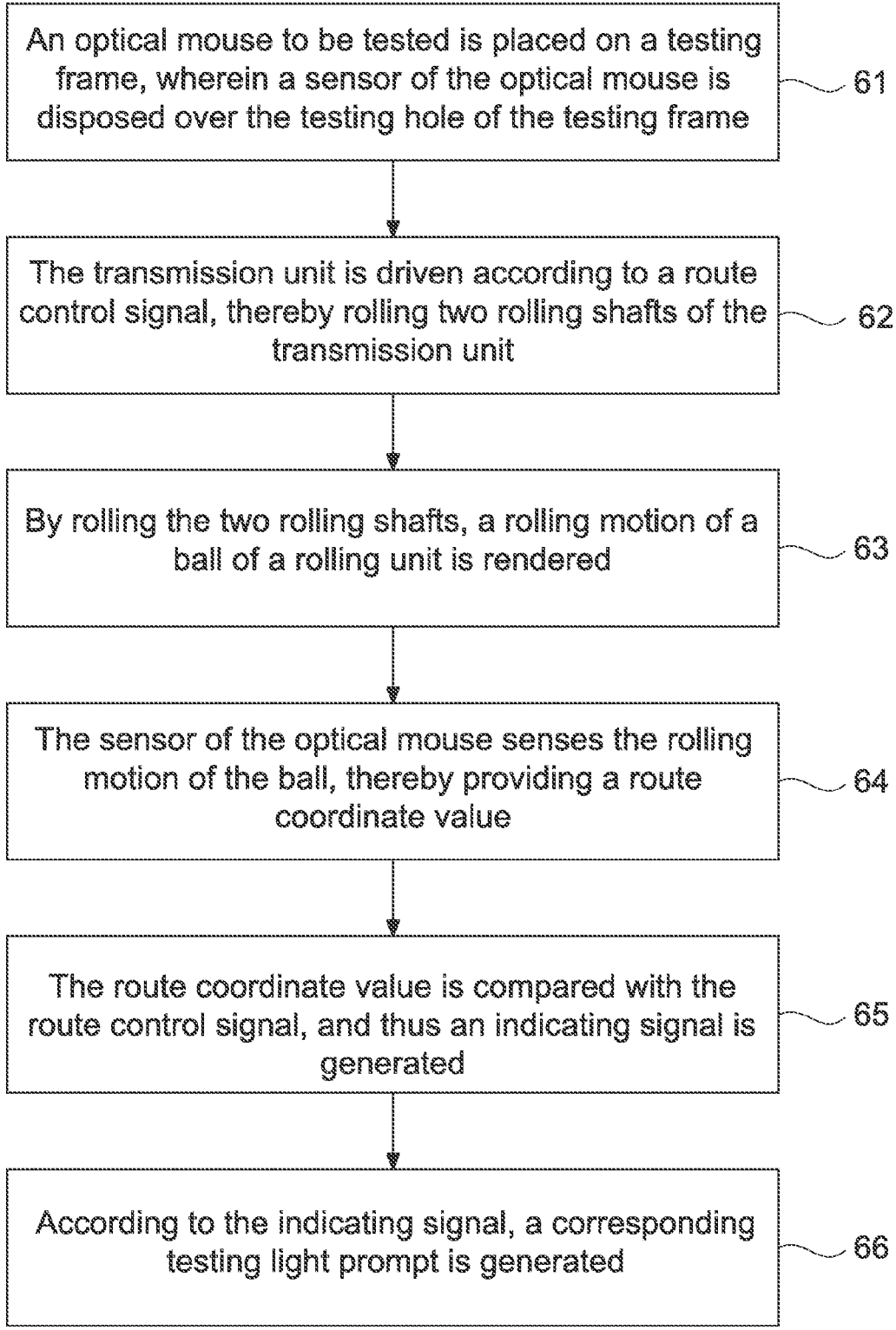
FIG. 8 is a flowchart illustrating an optical mouse testing method according to an embodiment of the present invention.

FIG. 8 is a flowchart illustrating an optical mouse testing method according to an embodiment of the present invention. First of all, an optical mouse 30 to be tested is placed on the testing frame 401 of the optical mouse testing device 40, wherein the sensor 302 of the optical mouse 30 is disposed over the testing hole 4013 of the testing frame 401 (Step 61). Next, the transmission unit 403 is driven according to a route control signal, thereby rolling the two rolling shafts 4031 of the transmission unit 403 (Step 62). By rolling the two rolling shafts 4031, a rolling motion of the ball 4042 of the rolling unit 404 is rendered (Step 63). Next, the sensor 302 of the optical mouse 30 senses the rolling motion of the ball 4042, thereby providing a route coordinate data (Step 64). Next, the route coordinate data is compared with the route control signal, and thus an indicating signal is generated (Step 65). According to the indicating signal, a corresponding testing light prompt is generated (Step 66).

In another embodiment of the present invention, the optical mouse testing device 40 is connected with a computer system. In the Step 62, according to the type of the optical mouse to be tested or a testing criterion, the user could input an instruction to the computer system through the input unit 51, thereby adjusting the route control signal. In the Step 65, the host 50 will compare the route coordinate data with the route control signal and provide more detailed testing data. The testing data includes respective differential ratio between the route coordinate data and the route control signal when the rolling trajectory is a vertical line trajectory, a horizontal line trajectory, an oblique line trajectory, a circular trajectory, a triangular trajectory or a square trajectory. Alternatively, the testing data includes respective differential ratio between the route coordinate data and the route control signal at different rolling speeds.

From the above description, the optical mouse testing device and the optical mouse testing method of the present invention are capable of effectively performing a trajectory testing operation without the need of moving the optical mouse. In addition, the optical mouse testing device of the present invention has reduced volume and enhanced space utilization, when compared with the conventional mouse testing machine.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical mouse testing device comprising:
   a testing frame comprising a testing hole, an upper surface and a lower surface, wherein an optical mouse to be tested is supported on said upper surface, said testing hole is arranged in a center of said testing frame, said lower surface is parallel with said upper surface, and a sensor of said optical mouse is disposed over said testing hole for providing a route coordinate data;
   a control unit disposed on said testing frame for receiving said route coordinate data and providing a route control signal and an indicating signal;
   a transmission unit disposed on said lower surface of said testing frame and electrically connected with said control unit, wherein said transmission unit comprises two rolling shafts, and said two rolling shafts are rotated according to said route control signal;
   a rolling unit disposed on said lower surface of said testing frame, and comprising a ball seat and a ball, wherein said ball seat is disposed under said testing hole for supporting said ball, and said ball is contacted with said two rolling shafts; and
   an indicating unit disposed on said testing frame and electrically connected with said control unit, wherein when receiving said indicating signal, said indicating unit generates a corresponding testing light prompt,
   wherein when said two rolling shafts are rolled to render a rolling motion of said ball, said sensor of said optical mouse senses said rolling motion of said ball to generate said route coordinate data, and said control unit compares said route control signal with said route coordinate data, thereby generating said indicating signal to indicate a testing result.

2. The optical mouse testing device according to claim 1 wherein the rolling directions of said rolling shafts are substantially perpendicular to each other, thereby rendering a vertical rolling motion and a horizontal rolling motion of said ball.

3. The optical mouse testing device according to claim 1 wherein said transmission unit further comprises two stepper motors, which are respectively connected with said two rolling shafts and operated according to said route control signal.

4. The optical mouse testing device according to claim 1 wherein said optical mouse testing device is connected with a computer system, and said computer system comprises:
   a host for providing said route control signal, said indicating signal and a testing data, and receiving said route coordinate data, wherein said host compares said route coordinate data with said route control signal, thereby generating said indicating signal and testing data;
   an input unit electrically connected to said host for allowing a user to adjust said route control signal; and
   a monitor electrically connected to said host for indicating said testing data.

5. The optical mouse testing device according to claim 1 wherein said transmission unit further comprises a fulcrum shaft in contact with said ball, wherein said ball is fixed between said two rolling shafts and said fulcrum shaft, and said fulcrum shaft is arranged at an internal angle bisector of an angle between said two rolling shafts.

6. The optical mouse testing device according to claim 5 wherein said ball seat comprises three notches, which are disposed under said lower surface of said testing frame for accommodating and positioning said two rolling shafts and said fulcrum shaft, respectively.

7. The optical mouse testing device according to claim 1 further comprising a retaining wall disposed on said upper surface of the testing frame and surrounding the testing hole, wherein a shape of said retaining wall is fitted to a shape of said optical mouse, so that said optical mouse is confined within a receptacle defined by said retaining wall.

8. An optical mouse testing method, comprising steps of:
   (1) placing a sensor of an optical mouse to be tested over a testing hole of a testing frame;

(2) driving a transmission unit according to a route control signal, thereby rolling two rolling shafts of said transmission unit;

(3) rendering a rolling motion of a ball of a rolling unit by rolling said two rolling shafts;

(4) allowing said senor of said optical mouse to sense said rolling motion of said ball, thereby providing a route coordinate data;

(5) comparing said route coordinate data with said route control signal, thereby generating an indicating signal; and (6) generating a testing light prompt according to said indicating signal.

9. The optical mouse testing method according to claim 8 wherein said step (2) further comprises a sub-step of adjusting said route control signal by an input unit.

10. The optical mouse testing method according to claim 8 wherein said step (5) further comprises a sub-step of comparing said route coordinate data with said route control signal, thereby generating a testing data.

* * * * *